United States Patent
Kusano et al.

(10) Patent No.: US 6,585,332 B2
(45) Date of Patent: Jul. 1, 2003

(54) BRAKE CONTROL DEVICE FOR A VEHICLE

(75) Inventors: Akihito Kusano, Toyota (JP); Yasuo Konishi, Toyoake (JP); Junji Ishimura, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/986,736

(22) Filed: Nov. 9, 2001

(65) Prior Publication Data

US 2002/0067071 A1 Jun. 6, 2002

(30) Foreign Application Priority Data

Nov. 9, 2000 (JP) ........................................ 2000-342034

(51) Int. Cl.[7] ................................................ B60T 8/34
(52) U.S. Cl. .................................................. 303/113.4
(58) Field of Search ........................ 303/113.1, 113.4, 303/154, 115.1, 116.1, 119.2, DIG. 2

(56) References Cited

U.S. PATENT DOCUMENTS

| | | | |
|---|---|---|---|
| 4,812,777 A | * | 3/1989 | Shirai ........................... 303/14 |
| 4,989,925 A | | 2/1991 | Kohno |
| 5,951,115 A | * | 9/1999 | Sakai et al. ..................... 303/3 |
| 6,217,127 B1 | * | 4/2001 | Kusano et al. .................. 303/3 |
| 6,247,762 B1 | * | 6/2001 | Kusano et al. .................. 303/3 |
| 6,290,310 B1 | * | 9/2001 | Kusano ................. 303/122.11 |

* cited by examiner

*Primary Examiner*—Jack Lavinder
*Assistant Examiner*—Xuan Lan Nguyen
(74) *Attorney, Agent, or Firm*—Burns, Doane, Swecker & Mathis, LLP

(57) ABSTRACT

A brake control device for a vehicle includes a master cylinder generating a master cylinder hydraulic pressure in response to a brake pedal depressing force, a wheel cylinder connected with the master cylinder via a hydraulic conduit, a stroke simulator connected to a branch hydraulic conduit branching from the hydraulic conduit, a first solenoid valve connecting or disconnecting the master cylinder with the wheel cylinder and disposed at the hydraulic conduit between a branch portion where the branch hydraulic conduit branches from the hydraulic conduit and the wheel cylinder, a second solenoid valve connecting or disconnecting the master cylinder with the stroke simulator, a pressure controlling mechanism having a pressure source and connected at a portion of the hydraulic circuit between the first solenoid valve and the wheel cylinder, and a controller for controlling the pressure controlling mechanism, the first solenoid valve and the second solenoid valve.

17 Claims, 1 Drawing Sheet

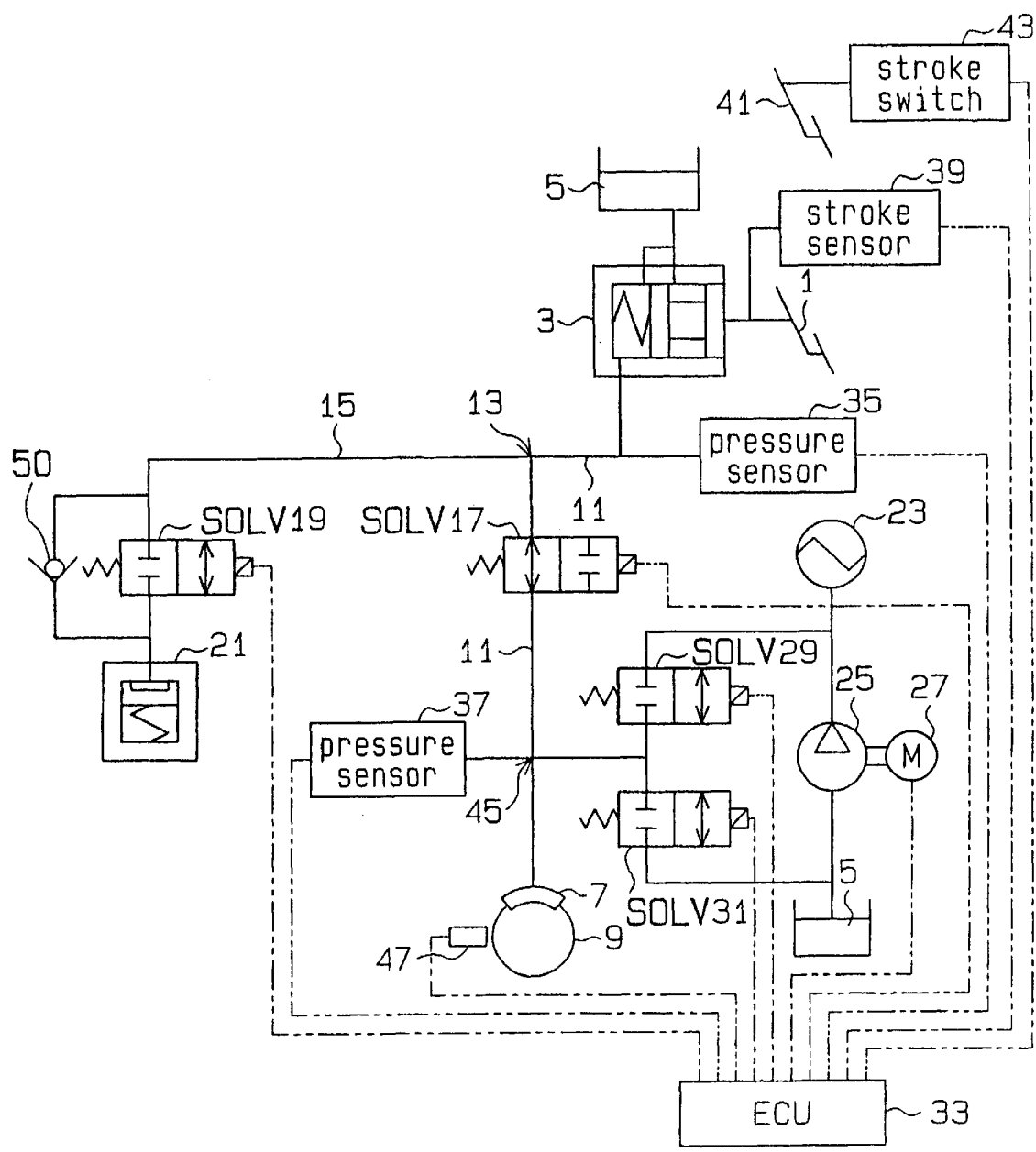

BRAKE CONTROL DEVICE FOR A VEHICLE

This application is based on and claims priority under 35 U.S.C. § 119 with respect to Japanese Patent Application No. 2000-342034 filed on Nov. 9, 2000, the entire content of which is incorporated herein by reference.

FIELD OF THE INVENTION

This invention generally relates to a brake control device for a vehicle. More specifically, this invention relates to a brake control device for a vehicle having a stroke simulator for simulating the stroke amount of the brake pedal and a pressure controlling mechanism for controlling the hydraulic pressure in the wheel brake cylinder.

BACKGROUND OF THE INVENTION

A known brake control device disclosed in a Japanese patent application publication published on Mar. 23, 1988 as Toku-Kai-Sho 63(1988)-64858 includes a master cylinder that generates a master cylinder hydraulic pressure in response to a depressing force applied to a brake pedal, a wheel cylinder connected with the master cylinder via a hydraulic conduit, a stroke simulator connected with an end of a branch hydraulic conduit branching from the hydraulic conduit, and a pressure controlling mechanism having a pressure source and connected with a halfway portion of the hydraulic circuit between the branch portion and the wheel cylinder. The pressure controlling mechanism controls the wheel cylinder hydraulic pressure by way of a hydraulic pressure generated by the pressure source, and a solenoid valve is disposed at the branch portion and changes the connecting relationship of the hydraulic conduits so that the master cylinder is connected with the stroke simulator when the pressure controlling mechanism is in the normal condition and the master cylinder is connected with the wheel cylinder when the pressure controlling mechanism is in an abnormal condition. This brake control device with the pressure controlling mechanism controls the wheel cylinder hydraulic pressure by the pressure controlling mechanism when the pressure controlling mechanism is in the normal condition. The brake control device controls the wheel cylinder hydraulic pressure by the master cylinder hydraulic pressure in response to the depressing force of the brake pedal only when the pressure controlling mechanism is in the abnormal condition.

In the above brake control device, the master cylinder is always connected with the stroke simulator when the pressure controlling mechanism is in the normal condition. In such a case, the hydraulic pressure which is equal to the master cylinder hydraulic pressure is always applied to the stroke simulator. Therefore, the stroke simulator must have sufficient strength to bear with the hydraulic pressure corresponding to the maximum depressing force applied by the driver. Consequently, the stroke simulator becomes relatively large and its manufacturing cost is also relatively high.

SUMMARY OF THE INVENTION

According to one aspect of the invention, a brake control device for a vehicle includes a master cylinder which generates a master cylinder hydraulic pressure in response to a depressing force applied to a brake pedal, a wheel cylinder connected with the master cylinder via a hydraulic conduit, a stroke simulator connected to an end of a branch hydraulic conduit branching from the hydraulic conduit, a first solenoid valve disposed at an intermediate portion of the hydraulic conduit between the wheel cylinder and a branch portion where the branch hydraulic conduit branches from the hydraulic conduit, with the first solenoid valve alternatively connecting or disconnecting the master cylinder with the wheel cylinder, a second solenoid valve disposed at an intermediate portion of the branch hydraulic conduit and alternatively connecting or disconnecting the master cylinder with the stroke simulator, a pressure controlling mechanism having a pressure source and connected at an intermediate portion of the hydraulic circuit between the first solenoid valve and the wheel cylinder to control hydraulic pressure to the wheel cylinder generated by the pressure source, and a controller which controls the pressure controlling mechanism, the first solenoid valve and the second solenoid valve. The hydraulic pressure in the wheel cylinder is controlled by the master cylinder hydraulic pressure in response to the depressing force applied to the brake pedal in a state that the controller controls the first solenoid valve to be open and the second solenoid valve to be closed when the pressure controlling mechanism is in an abnormal condition. The hydraulic pressure in the wheel cylinder is controlled by the pressure controlling mechanism under the control of the controller in a state in which the controller controls the first solenoid valve to be closed and the second solenoid valve to be open when the pressure controlling mechanism is in a normal condition and the master cylinder hydraulic pressure is lower than a predetermined level. The hydraulic pressure in the wheel cylinder is controlled by the pressure controlling mechanism under the control of the controller in a state in which the controller controls the first solenoid valve to be closed and the second solenoid valve to be closed when the pressure controlling mechanism is in the normal condition and the master cylinder hydraulic pressure is equal to or greater than the predetermined level.

The state in which the pressure controlling mechanism is in the abnormal condition corresponds to the state in which the pressure controlling mechanism cannot or is unable to generate the target wheel cylinder hydraulic pressure ordered or determined by the controller. The state in which the pressure controlling mechanism is in the normal condition corresponds to the state in which the pressure controlling mechanism can or is able to generate the target wheel cylinder hydraulic pressure ordered or determined by the controller.

According to another aspect of the invention, a brake control device for a vehicle includes a master cylinder which generates a master cylinder hydraulic pressure in response to a depressing force applied to a brake pedal, a sensor which senses the master cylinder hydraulic pressure, a wheel cylinder connected with the master cylinder via a hydraulic conduit, a stroke simulator connected to a branch hydraulic conduit branching from the hydraulic conduit, a first solenoid valve disposed in the hydraulic conduit between the wheel cylinder and a point where the branch hydraulic conduit branches from the hydraulic conduit to alternatively permit and prevent communication between the master cylinder and the wheel cylinder, a second solenoid valve disposed in the branch hydraulic conduit to alternatively permit and prevent communication between the master cylinder and the stroke simulator, and a pressure controlling mechanism connected to the hydraulic circuit between the first solenoid valve and the wheel cylinder to produce hydraulic pressure, with the pressure controlling mechanism including a pressure source. A controller is operatively connected to the pressure controlling mechanism, the first solenoid valve and the second solenoid valve to close the first solenoid valve, open the second solenoid valve and operate the pressure controlling mechanism to apply the hydraulic pressure produced by the pressure controlling mechanism to the wheel cylinder when the pressure controlling mechanism is in a normal condition and the master cylinder hydraulic pressure sensed by the sensor is less than a first predetermined pressure level, and to close the first solenoid valve, close the second solenoid valve and operate the pressure controlling mechanism to apply the hydraulic pressure produced by the pressure controlling mechanism to the wheel cylinder when the pressure controlling mechanism is in the normal condition and the master cylinder hydraulic pressure sensed by the sensor is greater than the predetermined level.

According to another aspect of the invention, a method of controlling brake force in a vehicle involves generating a master cylinder hydraulic pressure in response to a depressing force applied to a brake pedal, sensing the master cylinder hydraulic pressure, controlling hydraulic pressure supplied to a wheel cylinder from a pressure controlling mechanism that includes a pressure source, introducing the master cylinder hydraulic pressure into a stroke simulator while hydraulic pressure is supplied to the wheel cylinder from the pressure controlling mechanism when the master cylinder hydraulic pressure is less than a predetermined value and the pressure controlling mechanism is in a normal condition, and preventing the master cylinder hydraulic pressure from being introduced into the stroke simulator while hydraulic pressure is supplied to the wheel cylinder from the pressure controlling mechanism when the master cylinder hydraulic pressure is greater than a predetermined value and the pressure controlling mechanism is in the normal condition.

BRIEF DESCRIPTION OF THE DRAWING

The foregoing and additional features and characteristics of the present invention will become more apparent from the following detailed description considered with reference to the accompanying drawing FIGURE which is a block diagram schematically illustrating the brake control device according to the present invention.

DETAILED DESCRIPTION OF THE INVENTION

The drawing FIGURE schematically illustrates a brake control device for a vehicle. To simplify the description and explanation of the vehicle brake control device, the drawing FIGURE illustrates the brake control device in conjunction with only one wheel. However, it is to be understood that the description of the brake control device set forth below is equally applicable to the other three wheels.

As shown in the drawing FIGURE, a master cylinder 3 is connected to a reservoir 5 which stores brake fluid and supplies the brake fluid to the master cylinder 3 to output a master cylinder hydraulic pressure in response to a depressing pressure or force applied to a brake pedal 1 by a driver of the vehicle. The master cylinder hydraulic pressure is transmitted to a wheel cylinder 7 via a hydraulic conduit 11 and a solenoid valve SOLV 17 (first solenoid valve) so that a braking force is applied to the wheel 9. The solenoid valve SOLV 7 is a normally open solenoid valve disposed in the hydraulic conduit 11.

A branch conduit 15 diverges or extends from a branch portion or a branch point 13 of the hydraulic conduit 11. A stroke simulator 21 is connected to the end of the branch conduit 15 via a solenoid valve SOLV 19 (second solenoid valve). The solenoid valve SOLV 19 is a normally closed solenoid valve disposed in the branch conduit 15. When the solenoid valve SOLV 17 is closed, brake fluid communication between the master cylinder 3 and the wheel cylinder 7 is interrupted. Because the brake fluid in the master cylinder 7 is not consumed by the wheel cylinder 7 in response to the operation of the brake pedal 1, the driver may experience a strange feeling when the driver depresses the brake pedal 1. That is, the feeling expected by the driver during the brake pedal stroke is not generated. The stroke simulator 21 eliminates this strange feeling by estimating the consumption of the brake fluid to simulate a pedal feeling with an appropriate stroke. The stroke simulator 21 is a mechanically well known type and so a detailed description of the structure associated with the stroke simulator 21 is not set forth can be omitted.

The solenoid valve SOLV 19 is interposed in the branch conduit 15 between the branch portion 13 and the stroke simulator 21. A check valve 50 is disposed in parallel to the solenoid valve SOLV 19. The solenoid valve SOLV 19 is connected to the end of the branch conduit 15 and to the stroke simulator 21 in parallel with the check valve 50. The check valve 50 permits brake fluid flow from the stroke simulator 21 to the master cylinder 3 and resists or prevents brake fluid flow in the opposite direction. When the solenoid valve SOLV 19 is closed, the check valve 50 will be open if the hydraulic pressure applied to the stroke simulator 21 is higher than the master cylinder hydraulic pressure outputted by the master cylinder 3. At this time, the check valve 50 establishes fluid communication with both the input side and the output side of the solenoid valve SOLV 19, and maintains the hydraulic pressure applied to the stroke simulator 21 at a level equal to the master cylinder hydraulic pressure outputted by the master cylinder 3.

As further shown in the drawing FIGURE, a pressure controlling mechanism is connected to the hydraulic conduit 11 at a point 45 in the hydraulic conduit 11 connecting the solenoid valve SOLV 17 with the wheel cylinder 7. The pressure controlling mechanism is mainly comprised of a pump 25 serving as a pressure source, an electric motor 27 driving the pump 25, an accumulator 23, a solenoid valve SOLV 29 in the form of a normally closed valve, a solenoid valve SOLV 31 in the form of a normally closed valve and the reservoir 5. The accumulator 23 accumulates the hydraulic pressure pressurized by the pump 25. The solenoid valve SOLV 29 in the form of the normally closed valve is activated to increase the hydraulic pressure of the wheel cylinder 7 (the wheel cylinder hydraulic pressure). In contrast, the solenoid valve SOLV 31 in the form of the normally closed valve is activated for decreasing the wheel cylinder hydraulic pressure. The reservoir 5, which stores the brake fluid drained through the solenoid valve SOLV 31, is connected to the inlet port of the pump 25. The discharging pressure of the pump 25 is maintained high in cooperation with the accumulator 23. By using this high discharging pressure, and by appropriately switching the opening degree of the solenoid valve SOLV 29 and the opening degree of the solenoid valve SOLV 31, the wheel cylinder hydraulic pressure can be selectively increased, decreased and maintained.

An ECU 33 serving as a control means calculates a target wheel cylinder hydraulic pressure and controls the solenoid valve SOLV 19, the solenoid valve SOLV 17, the solenoid valve SOLV 29, the solenoid valve SOLV 31, and the electric motor 27 based on the input signals from various sensors. The sensors include a stroke sensor 39 which senses the operating amount of the brake pedal 1, a stroke switch 43 which senses the operating amount of an acceleration pedal 41, a pressure sensor 35 which senses the master cylinder hydraulic pressure, a pressure sensor 37 which senses the wheel cylinder hydraulic pressure, and a wheel speed sensor 47 which senses the wheel rotational speed of the wheel 9. In the aforementioned brake control device, when the pressure controlling mechanism is normally activated, the wheel hydraulic pressure is controlled by the pressure controlling mechanism. On the other hand, in the event the pressure controlling mechanism should fail, the wheel cylinder hydraulic pressure is directly controlled by applying the master cylinder hydraulic pressure in response to the depressing force of the brake pedal 1.

The control steps or operation associated with the brake control device are as follows. First, the control steps or operation carried out by the brake control device when the pressure controlling mechanism is normally activated is as follows. When the pressure controlling mechanism is normally activated and while the brake is controlled, the ECU 33 excites or energizes the normally open solenoid valve SOLV 17 to close the solenoid valve SOLV 17. In addition, the ECU 33 excites or energizes the normally closed solenoid valve SOLV 19 to open the solenoid valve SOLV 19. The time at which the solenoid valve SOLV 17 and the solenoid valve SOLV 19 are excited or energized is determined to be the time that the ECU 33 judges that the driver has operated the brake pedal 1 based on the input signal from the stroke sensor 39. After that, if the ECU 33 judges that the driver has stopped depressing the brake pedal 1, the ECU 33 stops exciting or energizing both the solenoid valve SOLV 17 and the solenoid valve SOLV 19.

When the pressure controlling mechanism is normally activated and brake control is necessary, the ECU 33 excites both the solenoid valve SOLV 17 and the solenoid valve SOLV 19 to disconnect the master cylinder 3 from the wheel cylinder 7 and to provide communication between the master cylinder 3 and the stroke simulator 21. In addition, both the solenoid valve SOLV 17 and the solenoid valve SOLV 19 may be continuously excited or energized while the ignition switch (not shown) is ON.

When the pressure controlling mechanism is normally activated, a wheel cylinder hydraulic pressure is controlled by the pressure controlling mechanism. The ECU 33 detects the master cylinder hydraulic pressure based on the input signal sent from the pressure sensor 35 to determine the target wheel cylinder pressure. The ECU 33 appropriately switches the opening of the solenoid valve SOLV 29 and the opening of the solenoid valve SOLV 31 to control the wheel cylinder hydraulic pressure. In addition, the pressure controlling mechanism controls the vehicle running condition, such as an anti-skid brake control, a traction control, a vehicle stability control and the like, based on commands sent from the ECU 33. A detailed description of these controls is not included here as they are known in the art.

As described above, when the pressure controlling mechanism is normally activated and the brake is controlled, the ECU 33 essentially energizes or excites the solenoid valve SOLV 19 to be open. Thus the master cylinder 3 is connected with the stroke simulator 21. The ECU 33 further performs the following control step or operation according to the present invention. While the master cylinder hydraulic pressure detected by the pressure sensor 35 is increased, if the hydraulic pressure of the master cylinder 3 reaches a first predetermined level P1, the ECU 33 switches the solenoid valve SOLV 19 to be closed. After that, while the master cylinder hydraulic pressure is decreased, if the master cylinder hydraulic pressure reaches a second predetermined level P2 which is smaller than the first predetermined level P1, the ECU 33 switches the solenoid valve SOLV 19 to be open. As described above, the solenoid valve SOLV 19 is switched to be closed when the master cylinder hydraulic pressure reaches the predetermined level P1 while the master cylinder hydraulic pressure is increased. After that, even if the master cylinder hydraulic pressure is higher than the predetermined level P1, the solenoid valve SOLV 19 remains closed and the check valve 50 is also closed. Therefore, the stroke simulator 21 receives the constant hydraulic pressure which is equal to the first predetermined level P1, and does not receive hydraulic pressure which is higher than the first predetermined level P1. Consequently, if the first predetermined level P1 is determined to be an appropriate level which is smaller than a maximum level corresponding to the maximum depressing force that the driver applies to the brake pedal 1, the dimension or size of the stroke simulator 21 can be reduced.

In addition to the above operational steps, after the master cylinder hydraulic pressure is decreased below the first predetermined level P1, the check valve 50 opens or permits the brake fluid to flow from the stroke simulator 21 side to the master cylinder side. Thus the hydraulic pressure applied to the stroke simulator 21 is decreased together with the decrease in the master cylinder hydraulic pressure. Therefore, because the solenoid valve SOLV 19 is operated to be open when the master cylinder hydraulic pressure reaches the second predetermined level P2 which is smaller than the first predetermined level P1 while the master cylinder hydraulic pressure is decreased, the check valve 50 has already been opened when the solenoid valve SOLV 19 is turned to be open. Thus the hydraulic pressure applied to the stroke simulator 21 is kept as high as the master cylinder hydraulic pressure. In this stage, the difference between the hydraulic pressures at both the stroke simulator 21 side and the master cylinder 3 side of the solenoid valve SOLV 19 becomes zero, which prevents a pulse of hydraulic pressure from surging to the master cylinder 3 the moment the solenoid valve SOLV 19 is turned to be opened or is energized. Accordingly, the driver of the vehicle is provided with a good brake operating feeling without any shock.

The operational process of the brake control device when the pressure controlling mechanism is not activated because of a failure of the pressure controlling mechanism or an abnormal condition of the pressure controlling mechanism is as follows. The failure or abnormal condition of the pressure controlling mechanism can involve, for example, a mechanical failure of the pump 25. Although the pump 25 should be controlled to discharge constant pressure by a discontinuous activation of the electric motor 27 in cooperation with the accumulator 23, if the discharging hydraulic pressure of the pump 25 does not reach a predetermined level, the ECU 33 judges that the pump 25 as the pressure source is broken or malfunctioning. The ECU 33 thus determines or detects the failure of the pressure controlling mechanism. The failure or abnormal condition of the pressure controlling mechanism may also include, by way of example, the failure of the solenoid valve SOLV 29, the failure of the solenoid valve SOLV 31, and the failure of the ECU 33.

If the ECU 33 determines the failure of the pressure controlling mechanism, the wheel cylinder hydraulic pressure cannot be controlled by the pressure controlling mechanism. Thus, the ECU 33 controls the solenoid valve SOLV 17 to be open, and further controls the solenoid valve SOLV 19 to be closed. Accordingly, the above control of the ECU 33 establishes communication between the master cylinder 3 and the wheel cylinder 7. Then the hydraulic pressure of the wheel cylinder 7 is controlled by the master cylinder hydraulic pressure in response to depression of the brake pedal 1. The above-described control in connection with the failure or abnormal state of the pressure controlling mechanism is maintained until the failure of the pressure controlling mechanism is solved or corrected.

As described above, in the brake control device of the disclosed embodiment, if the master cylinder hydraulic pressure exceeds the predetermined level, the solenoid valve SOLV 19 is closed. Thus the excessive hydraulic, which is above the predetermined level, is not applied to the stroke simulator 21 even if the master cylinder hydraulic pressure exceeds the predetermined level P1. The stroke simulator 21 can thus be designed to have sufficient strength to withstand the predetermined pressure. Further, the stroke simulator 21 need not be designed to have a strength sufficient to withstand the hydraulic pressure corresponding to the maximum depressing pressure that the driver may apply to the brake pedal 1. Accordingly, it is possible to reduce or minimize the size and structure of the stroke simulator 21.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A brake control device for a vehicle comprising:
   a master cylinder which generates a master cylinder hydraulic pressure in response to a depressing force applied to a brake pedal;
   a wheel cylinder connected with the master cylinder via a hydraulic conduit;
   a stroke simulator connected to an end of a branch hydraulic conduit branching from the hydraulic conduit;
   a first solenoid valve disposed at an intermediate portion of the hydraulic conduit between the wheel cylinder and a branch portion where the branch hydraulic conduit branches from the hydraulic conduit, the first solenoid valve alternatively connecting or disconnecting the master cylinder with the wheel cylinder;
   a second solenoid valve disposed at an intermediate portion of the branch hydraulic conduit and alternatively connecting or disconnecting the master cylinder with the stroke simulator;
   a pressure controlling mechanism having a pressure source and connected at an intermediate portion of the hydraulic circuit between the first solenoid valve and the wheel cylinder, the pressure controlling mechanism controlling hydraulic pressure to the wheel cylinder generated by the pressure source;
   control means for controlling the pressure controlling mechanism, the first solenoid valve and the second solenoid valve;
   the hydraulic pressure in the wheel cylinder being controlled by the master cylinder hydraulic pressure in response to the depressing force applied to the brake pedal in a state that the control means controls the first solenoid valve to be open and the second solenoid valve to be closed when the pressure controlling mechanism is in an abnormal condition;
   the hydraulic pressure in the wheel cylinder being controlled by the pressure controlling mechanism controlled by the control means in a state that the control means controls the first solenoid valve to be closed and the second solenoid valve to be open when the pressure controlling mechanism is in a normal condition and the master cylinder hydraulic pressure is lower than a predetermined level;
   the hydraulic pressure in the wheel cylinder being controlled by the pressure controlling mechanism controlled by the control means in a state that the control means controls the first solenoid valve to be closed and the second solenoid valve to be closed when the pressure controlling mechanism is in the normal condition and the master cylinder hydraulic pressure is equal to or greater than the predetermined level.

2. The brake control device for the vehicle in accordance with claim 1, further comprising:
   a check valve disposed in parallel with the second solenoid valve and permitting one-way flow from the stroke simulator to the master cylinder;
   the control means controlling the second solenoid valve to be changed over from the open state to the closed state when the pressure controlling mechanism is in the normal condition and the master cylinder hydraulic pressure reaches the first predetermined level as the master cylinder hydraulic pressure is increasing; and
   the control means controlling the second solenoid valve to be changed over from the closed state to the open state when the master cylinder hydraulic pressure reaches a second predetermined level which is lower than the first predetermined level the master cylinder hydraulic pressure is decreasing.

3. The brake control device for the vehicle in accordance with claim 1, wherein the pressure controlling mechanism further includes a pair of normally closed valves.

4. The brake control device for the vehicle in accordance with claim 1, including a pressure sensor connected to the hydraulic circuit between the first solenoid valve and the wheel cylinder.

5. A brake control device for a vehicle comprising:
   a master cylinder which generates a master cylinder hydraulic pressure in response to a depressing force applied to a brake pedal;
   a sensor which senses the master cylinder hydraulic pressure;
   a wheel cylinder connected with the master cylinder via a hydraulic conduit;
   a stroke simulator connected to a branch hydraulic conduit branching from the hydraulic conduit;
   a first solenoid valve disposed in the hydraulic conduit between the wheel cylinder and a point where the branch hydraulic conduit branches from the hydraulic conduit, the first solenoid valve alternatively permitting and preventing communication between the master cylinder and the wheel cylinder;
   a second solenoid valve disposed in the branch hydraulic conduit to alternatively permit and prevent communication between the master cylinder and the stroke simulator;
   a pressure controlling mechanism connected to the hydraulic circuit between the first solenoid valve and the wheel cylinder to produce hydraulic pressure, the pressure controlling mechanism including a pressure source;

control means operatively connected to the pressure controlling mechanism, the first solenoid valve and the second solenoid valve to close the first solenoid valve, open the second solenoid valve and operate the pressure controlling mechanism to apply the hydraulic pressure produced by the pressure controlling mechanism to the wheel cylinder when the pressure controlling mechanism is in a normal condition and the master cylinder hydraulic pressure sensed by the sensor is less than a first predetermined pressure level, and to close the first solenoid valve, close the second solenoid valve and operate the pressure controlling mechanism to apply the hydraulic pressure produced by the pressure controlling mechanism to the wheel cylinder when the pressure controlling mechanism is in the normal condition and the master cylinder hydraulic pressure sensed by the sensor is greater than the predetermined level.

6. The brake control device for the vehicle in accordance with claim 5, including a check valve disposed in parallel with the second solenoid valve and permitting one-way flow from the stroke simulator to the master cylinder.

7. The brake control device for the vehicle in accordance with claim 5, wherein the pressure controlling mechanism further includes a pair of normally closed valves.

8. The brake control device for the vehicle in accordance with claim 5, including a pressure sensor connected to the hydraulic circuit between the first solenoid valve and the wheel cylinder.

9. The brake control device for the vehicle in accordance with claim 5, wherein the control means opens the first solenoid valve and closes the second solenoid valve to apply the master cylinder hydraulic pressure produced by the master cylinder to the wheel cylinder in response to the depressing force applied to the brake pedal when the pressure source is in an abnormal condition.

10. A method of controlling brake force in a vehicle comprising:

generating a master cylinder hydraulic pressure in response to a depressing force applied to a brake pedal;

sensing the master cylinder hydraulic pressure;

controlling hydraulic pressure supplied to a wheel cylinder from a pressure controlling mechanism that includes a pressure source;

introducing the master cylinder hydraulic pressure into a stroke simulator while hydraulic pressure is supplied to the wheel cylinder from the pressure controlling mechanism when the master cylinder hydraulic pressure is less than a predetermined value and the pressure controlling mechanism is in a normal condition; and preventing the master cylinder hydraulic pressure from being introduced into the stroke simulator while hydraulic pressure is supplied to the wheel cylinder from the pressure controlling mechanism when the master cylinder hydraulic pressure is greater than a predetermined value and the pressure controlling mechanism is in the normal condition.

11. The method of controlling brake force in a vehicle in accordance with claim 10, including supplying the master cylinder hydraulic pressure to the wheel cylinder when the pressure controlling mechanism is in an abnormal condition.

12. The method of controlling brake force in a vehicle in accordance with claim 10, wherein the wheel cylinder is connected with the master cylinder via a hydraulic conduit and the stroke simulator is connected to a branch hydraulic conduit branching from the hydraulic conduit, the master cylinder hydraulic pressure being introduced into the stroke simulator by closing a first solenoid valve disposed in the hydraulic conduit between the wheel cylinder and a point where the branch hydraulic conduit branches from the hydraulic conduit and opening a second solenoid valve disposed in the branch hydraulic conduit.

13. The method of controlling brake force in a vehicle in accordance with claim 12, wherein the master cylinder hydraulic pressure is prevented from being introduced into the stroke simulator by closing the first solenoid valve and closing the second solenoid valve.

14. The method of controlling brake force in a vehicle in accordance with claim 13, including reducing hydraulic pressure in the stroke simulator by way of a check valve disposed in parallel with the second solenoid valve.

15. The method of controlling brake force in a vehicle in accordance with claim 12, including reducing hydraulic pressure in the stroke simulator by way of a check valve disposed in parallel with the second solenoid valve.

16. The method of controlling brake force in a vehicle in accordance with claim 10, wherein the wheel cylinder is connected with the master cylinder via a hydraulic conduit and the stroke simulator is connected to a branch hydraulic conduit branching from the hydraulic conduit, the master cylinder hydraulic pressure being prevented from being introduced into the stroke simulator by closing a first solenoid valve disposed in the hydraulic conduit between the wheel cylinder and a point where the branch hydraulic conduit branches from the hydraulic conduit and closing a second solenoid valve disposed in the branch hydraulic conduit.

17. The method of controlling brake force in a vehicle in accordance with claim 16, including reducing hydraulic pressure in the stroke simulator by way of a check valve disposed in parallel with the second solenoid valve.

* * * * *